Sept. 20, 1927.  
D. M. TORRANCE  
EGG SUPPORTING AND TURNING DEVICE  
Filed Feb. 4, 1926

1,643,102

WITNESSES

INVENTOR  
D. M. TORRANCE,  
BY  
ATTORNEYS

Patented Sept. 20, 1927.

1,643,102

UNITED STATES PATENT OFFICE.

DANIEL MERRILL TORRANCE, OF GARWIN, IOWA.

EGG SUPPORTING AND TURNING DEVICE.

Application filed February 4, 1926. Serial No. 86,025.

This invention relates to egg supporting and turning devices especially adapted for use in incubators.

Briefly stated, an important object of this invention is to provide an egg supporting and turning device which is compact and in which the area of contact with the eggs is reduced to a minimum without increasing the possibility of breakage or rough handling of the eggs.

Other objects and advantages will be apparent during the course of the following description.

In the accompanying drawing forming a part of this application and in which like numerals are employed to designate like parts throughout the same, Figure 1 is a fragmentary plan view of an egg tray constructed in accordance with the invention, parts being broken away;

Figure 2:
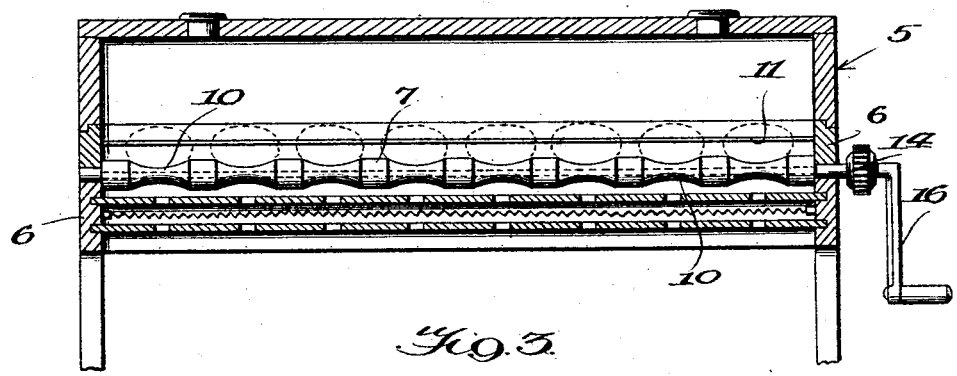
Figure 2 is a vertical transverse sectional view through the invention.

In the drawing, where for the purpose of illustration is shown a preferred embodiment of the invention, the numeral 5 generally designates a tray having side rails 6 to which the reduced end portions of a plurality of supporting shafts or rollers 7 are connected as clearly shown in Figure 2. One of the side rails 6 may be split longitudinally or formed in two separate sections, one below and one above the adjacent ends of the shafts so that the assembling of the tray is facilitated and so that the shafts may be taken out when necessary.

Figure 1:
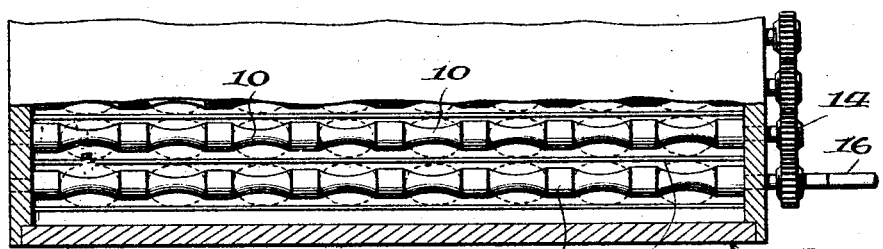
Figure 3:
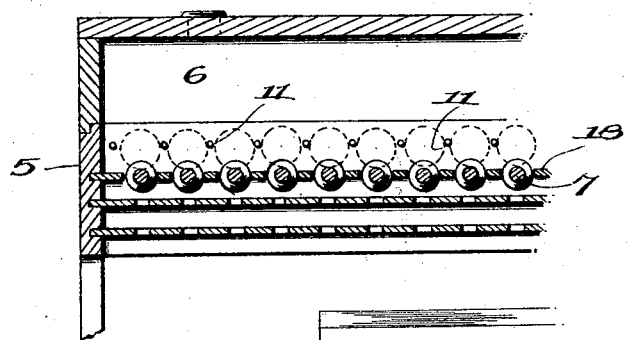
Figure 3 is a detail sectional view taken at right angles to Figure 1.
Figure 4:
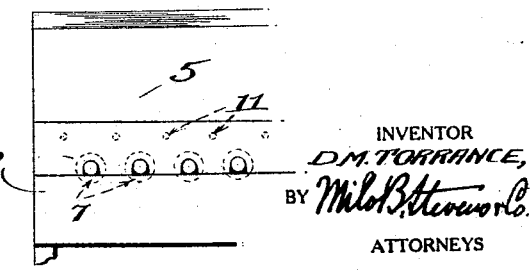
Figure 4 is a fragmentary side elevation of the invention.

Figures 1 and 2 illustrate that each shaft is provided with a series of recesses 10 forming seats for the eggs and the eggs are held directly upon the seats by parallel wires 11. Attention is now directed to the fact that the eggs are mounted directly upon the tops of the seats and are limited in lateral movement by the wires 11. The wires are shown as above the plane of the shafts and in vertical planes between the shafts so as to hold the eggs in position, and permit free circulation of air above and below the eggs which is very important in order to secure proper incubation. Also the wires effect an economy of space which is very important in a small incubator. Wires 11 will yield sufficiently to allow oversize eggs to rest on seats 10. Furthermore the use of such wires 11 above the rollers obviates chance of chicks catching feet in between same and rollers 7. Figure 3 further illustrates that each egg rests upon only one shaft and consequently the area of contact between the egg and the supporting means therefor is greatly reduced.

The end portions of the annularly grooved shafts are provided with spur gears 14 in mesh with each other so that the turning of one of the shafts by a crank 16 or by a motor will result in the simultaneous turning of all the shafts. Of course, the shafts are turned periodically for the proper incubation of the eggs.

Figure 3 illustrates that supporting strips 18 are positioned between the rollers to define a platform upon which the chicks upon being hatched may rest until removed from the tray.

With reference to the foregoing description taken in connection with the accompanying drawing it will be apparent that an egg supporting and turning device constructed in accordance with this invention will effectively support the eggs in proper incubating positions and that the eggs may be easily turned by the operation of the crank 16 or by any other means found expedient.

Having thus described the invention, what is claimed is:

An egg turning and supporting device comprising rails, a plurality of shafts connected to the rails and being annularly grooved to define seats for eggs, parallel wires connected to said rails and arranged above and at opposite sides of said shafts to hold the eggs upon the tops of said seats whereby each row of eggs rests solely upon one shaft and air will be permitted to circulate around all portions of the eggs, gears connecting all of the shafts, means whereby the shafts may be simultaneously turned, and strips between said shafts and defining a platform.

In testimony whereof I affix my signature.

DANIEL MERRILL TORRANCE.